United States Patent
Jacobs et al.

(10) Patent No.: US 12,516,396 B2
(45) Date of Patent: *Jan. 6, 2026

(54) NON-ORIENTED ELECTRICAL STEEL AND A METHOD OF MANUFACTURING NON-ORIENTED ELECTRICAL STEEL THEREOF

(71) Applicant: ArcelorMittal, Luxembourg (LU)

(72) Inventors: Sigrid Jacobs, Merelbeke (BE); Xavier Chassang, St Chély d'Apcher (FR); Elke Leunis, Ghent (BE)

(73) Assignee: ArcelorMittal, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 19/246,103

(22) Filed: Jun. 23, 2025

(65) Prior Publication Data
US 2025/0320575 A1    Oct. 16, 2025

Related U.S. Application Data

(63) Continuation of application No. PCT/IB2024/061337, filed on Nov. 14, 2024.

(30) Foreign Application Priority Data

Nov. 15, 2023    (WO) ................ PCT/IB2023/061522

(51) Int. Cl.
| | |
|---|---|
| C21D 9/46 | (2006.01) |
| C21D 6/00 | (2006.01) |
| C21D 8/12 | (2006.01) |
| C22C 38/00 | (2006.01) |
| C22C 38/04 | (2006.01) |
| C22C 38/06 | (2006.01) |
| C22C 38/20 | (2006.01) |
| C22C 38/34 | (2006.01) |
| H01F 1/147 | (2006.01) |

(52) U.S. Cl.
CPC ............ *C21D 9/46* (2013.01); *C21D 6/008* (2013.01); *C21D 8/1222* (2013.01); *C21D 8/1233* (2013.01); *C21D 8/1261* (2013.01); *C22C 38/002* (2013.01); *C22C 38/04* (2013.01); *C22C 38/06* (2013.01); *C22C 38/20* (2013.01); *C22C 38/34* (2013.01); *H01F 1/14791* (2013.01); *C21D 2211/005* (2013.01); *C22C 2202/02* (2013.01)

(58) Field of Classification Search
None
See application file for complete search history.

(56) References Cited

U.S. PATENT DOCUMENTS

| | | |
|---|---|---|
| 2008/0260569 A1 | 10/2008 | Bae et al. |
| 2013/0125601 A1 | 5/2013 | Kubota et al. |
| 2013/0167987 A1 | 7/2013 | Kim et al. |
| 2014/0238558 A1 | 8/2014 | Fujikara et al. |
| 2018/0119258 A1 | 5/2018 | Fujikura et al. |
| 2019/0345576 A1 | 11/2019 | Park et al. |
| 2020/0087748 A1 | 3/2020 | Lee et al. |
| 2021/0159002 A1 | 5/2021 | Okubo et al. |
| 2021/0371948 A1 | 12/2021 | Zaizen et al. |
| 2023/0045797 A1 | 2/2023 | Lee et al. |
| 2024/0035131 A1 | 2/2024 | Natori et al. |
| 2024/0038422 A1 | 2/2024 | Lee et al. |
| 2024/0417830 A1 | 12/2024 | Yue et al. |
| 2025/0188557 A1 | 6/2025 | Yue et al. |

FOREIGN PATENT DOCUMENTS

| | | |
|---|---|---|
| CN | 103498096 A | 1/2014 |
| CN | 105256227 A | 1/2016 |
| CN | 105950960 A | 9/2016 |
| CN | 111206192 A | 5/2020 |
| CN | 111471941 A | 7/2020 |
| CN | 113897549 A | 1/2022 |
| CN | 115198198 A | 10/2022 |
| CN | 115198199 A | 10/2022 |
| CN | 116288011 A | 6/2023 |
| EP | 2657357 A2 | 10/2013 |
| EP | 3173503 A1 | 5/2017 |
| EP | 3741874 A1 | 11/2020 |
| EP | 4079893 A2 | 10/2022 |
| EP | 4265744 A1 | 10/2023 |

(Continued)

OTHER PUBLICATIONS

Bertotti et al. "General Properties of Power Losses in Soft Ferromagnetic Materials"; published in IEEE Transactions on Magnetics, vol. 24, No. 1 of Jan. 1988.

(Continued)

*Primary Examiner* — Anthony M Liang
(74) *Attorney, Agent, or Firm* — Davidson Kappel LLC

(57) ABSTRACT

A non-oriented electrical steel sheet having a composition of the following elements, expressed in percentage by weight 0.0001%≤Carbon≤0.007%, 0.15%≤Manganese≤0.25%, 2.9%≤Silicon≤3.4%, 0.8%≤Aluminum≤1.1%, Phosphorus≤0.15%, Sulfur≤0.006%, Nitrogen≤0.09%, with 3.85%≤Si+Al+Mn≤5.5%, and the following optional elements 0%≤Niobium≤0.1%, 0%≤Titanium≤0.1%, 0%≤Vanadium≤0.1%, 0%≤Chromium≤1%, 0%≤Molybdenum≤0.5%, 0%≤Tungsten≤0.1%, 0%≤Cobalt≤1%, 0%≤Arsenic≤0.05%, 0.001%≤Calcium≤0.01%, 0%≤Copper≤1%, 0%≤Nickel≤1%, 0%≤Boron≤0.05%, 0%≤Lead≤0.2%, 0%≤Tin≤0.2%, 0%≤Antimony≤0.2%, the remainder composition being composed of iron and unavoidable impurities caused by processing. The microstructure is made of ferrite and including in area fraction, 80% to 100% recrystallized microstructure, 0% to 20% non-recrystallized microstructure wherein the average grain size of recrystallized microstructure is from 20 microns to 110 microns and having a percentage of eddy current losses in total iron losses less than 25% and simultaneously having a magnetic polarization at 5000 A/m from 1.625 T to 1.690 T.

13 Claims, No Drawings

(56) References Cited

FOREIGN PATENT DOCUMENTS

| | | |
|---|---|---|
| EP | 4265745 A1 | 10/2023 |
| EP | 4265749 A1 | 10/2023 |
| JP | H0559441 A | 3/1993 |
| JP | 2008127612 A | 6/2008 |
| JP | 2012036458 A | 2/2012 |
| JP | 2013091837 A | 5/2013 |
| JP | 2017119897 A | 7/2017 |
| KR | 20030053146 A | 6/2003 |
| KR | 20130076546 A | 7/2013 |
| KR | 20130127294 A | 11/2013 |
| KR | 20140058937 A | 5/2014 |
| KR | 20160061797 A | 6/2016 |
| KR | 101701195 B1 | 2/2017 |
| WO | WO9308313 A1 | 4/1993 |
| WO | WO02052048 A1 | 7/2002 |
| WO | WO2019132317 A1 | 7/2019 |
| WO | 3209807 B1 | 11/2020 |
| WO | WO2022210890 | 10/2022 |
| WO | WO2023070982 A1 | 5/2023 |
| WO | WO2025104640 A1 | 2/2025 |
| WO | WO 2025/104651 A1 | 5/2025 |
| WO | WO2025104469 A1 | 5/2025 |
| WO | WO2025104470 A1 | 5/2025 |
| WO | WO2025104641 A1 | 5/2025 |
| WO | WO2025104643 A1 | 5/2025 |
| WO | WO2025104644 A1 | 5/2025 |
| WO | WO2025104645 A1 | 5/2025 |
| WO | WO2025104646 A1 | 5/2025 |
| WO | WO2025104647 A1 | 5/2025 |
| WO | WO2025104648 A1 | 5/2025 |
| WO | WO2025104649 A1 | 5/2025 |
| WO | WO2025104650 A1 | 5/2025 |
| WO | WO2025104654 A1 | 5/2025 |
| WO | WO2025104655 A1 | 5/2025 |
| WO | WO2025104657 A1 | 5/2025 |
| WO | WO2025104658 A1 | 5/2025 |

OTHER PUBLICATIONS

See International Search Report of PCT/IB2024/061337, dated Feb. 21, 2025.

NON-ORIENTED ELECTRICAL STEEL AND A METHOD OF MANUFACTURING NON-ORIENTED ELECTRICAL STEEL THEREOF

This is a continuation of International Patent Application PCT/IB2024/061337, filed on Nov. 14, 2024, published as WO 2025/104642 A1, which claims priority to PCT/IB2023/061522, filed on Nov. 15, 2023, all of the above are hereby incorporated by reference herein.

The present invention relates to a non-oriented electrical steel sheet and a manufacturing method thereof. Specifically, the present invention relates to a non-oriented electrical steel sheet and a manufacturing method thereof that have low iron losses specifically a low eddy current loss while having good mechanical properties.

BACKGROUND

Intense research and development endeavors for higher performance properties have been required for a non-oriented electrical steel sheet to be used as an iron core material of a electrical machine. This has been due to a worldwide increase in seeking energy savings in an electrical apparatus. Recently in particular, as a motor to be used for an electric vehicle or the like, demand for a small-sized high-power motor has been high. Such an electric vehicle motors are designed to make high-speed rotation possible to thereby obtain high torque while having the lowest possible losses. This requires light and highly efficient non oriented electrical steels which have low losses as their key property.

SUMMARY OF THE INVENTION

Finding a balance between losses, permeability, polarization, thermal conductivity, tensile strength and yield strength is vital for non-oriented electrical steels.

The lower the iron losses in the electric machine, the higher its efficiency, hence to reduce the quantity of the iron losses in an electrical machine the manufacturers of the electrical machines have several options, whereby their principal options are to reduce either hysteresis losses or eddy current losses to improve the efficiency of their electrical machine. Advances are frequently achieved by a combination of the two approaches. This invention relates to the second option, namely the reduction of eddy current losses for an electrical machine. There is two-track alternatives to reduce the eddy current losses:

The first track consists of reducing the thicknesses of the steel sheets used in the electrical machines such as to have the thickness of the steel sheet below 0.35 mm or even lower. Unfortunately, this solution has its limits on account of a reduction in the stacking factor which decreases the torque achievable for a given machine height and further a prohibitive decrease in the rigidity of certain automotive parts and the appearance of acoustical problems that create uncomfortable conditions for the passenger.

The second track consists of optimizing the elemental composition of the steel sheet, such as increasing the amount of alloying elements to restrict the eddy current losses. Among these alloying elements, Aluminum and Manganese are ones have attractive mechanical and magnetic properties while making it possible to significantly reduce the eddy current losses. However, addition of alloying elements can be done only up to a limit because after a certain percentage presence alloying elements will impact hysteresis losses and magnetic polarization.

Earlier research and developments in the field of high strength non-oriented electrical steel have resulted in several methods for producing high strength non-oriented electrical steel. US2021/0371948 for example is non-oriented electrical steel sheet with an average magnetostriction $\lambda p-p$ at 400 Hz and 1.0 T of not more than $4.5 \times 10^{-6}$, and area ratio of recrystallized grains at a section in rolling direction of steel sheet of 40 to 95% and an average grain size of 10 to 40 microns is obtained by subjecting a steel slab containing, in mass %, C: not more than 0.005%, Si: 2.8 to 6.5%, Mn: 0.05 to 2.0%, Al: not more than 3.0%, P: not more than 0.20%, S: not more than 0.005%, N: not more than 0.005%, Ti: not more than 0.003%, V: not more than 0.005% and Nb: not more than 0.005% and satisfying Si-2Al-Mn≥0 to hot rolling, hot-band annealing, cold rolling and finish annealing under adequate cold rolling and finish annealing conditions, and a motor core is manufactured by such a steel sheet. US2021/0371948 does not demonstrate the total elongation and eddy current loss at all.

It is an object of the present invention to solve these problems by making non-oriented electrical steel sheets that simultaneously have a percentage of eddy current loss in total iron loss of less than 25%, and preferably from 18% to 23% when calculated in accordance with Bertotti method and a magnetic polarization at 5000 A/m (J50) from 1.625 T to 1.690 T and preferably from 1.630 T to 1.680 T.

In preferred embodiments, the additional following properties can be also reached, alone or in combination:
- an ultimate tensile strength of 540 MPa or more in both transversal direction as well as rolling direction and preferably more than 560 MPa in both transversal direction as well as rolling direction
- a yield strength from 430 MPa or more in both transversal direction as well as rolling direction and preferably from 440 MPa or more in both transversal direction as well as rolling direction
- a total elongation of 14% or more in both transversal direction as well as rolling direction and preferably more than or equal to 16% in both transversal direction as well as rolling direction
- a total loss from 11 to 13 W/kg when measured at 1 T and 400 Hz and preferably from 11 to 13 W/kg when measured at 1 T and 400 Hz and more preferably from 11 to 12 W/kg when measured at 1 T and 400 Hz Preferably, such steel can also have a good suitability for rolling with good punchability and coatability.

Preferably, a hardness greater than or equal to 185 HV and preferably hardness greater than or equal to 195 HV.

The present invention provides a non-oriented electrical steel sheet having a composition comprising of the following elements, expressed in percentage by weight:

$$0.0001\% \leq \text{Carbon} \leq 0.007\%$$

$$0.15\% \leq \text{Manganese} \leq 0.25\%$$

$$3.1\% \leq \text{Silicon} \leq 3.3\%$$

$$0.8\% \leq \text{Aluminum} \leq 1.1\%$$

$$\text{Phosphorus} \leq 0.15\%$$

$$\text{Sulfur} \leq 0.006\%$$

$$\text{Nitrogen} \leq 0.09\%$$

$$\text{with } 3.85\% \leq \text{Si} + \text{Al} + \text{Mn} \leq 5.5\%$$

and can contain one or more of the following optional elements $0\% \leq \text{Niobium} \leq 0.1\%$ $0\% \leq \text{Titanium} \leq 0.1\%$ $0\% \leq \text{Vanadium} \leq 0.1\%$ $0\% \leq \text{Chromium} \leq 1\%$ $0\% \leq \text{Molybdenum} \leq 0.5\%$ $0\% \leq \text{Tungsten} \leq 0.0\%$ $0\% \leq \text{Cobalt} \leq 1\%$ $0\% \leq \text{Arsenic} \leq 0.05\%$ $0.001\% \leq \text{Calcium} \leq 0.01\%$ $0\% \leq \text{Copper} \leq 1\%$ $0\% \leq \text{Nickel} \leq 1\%$ $0\% \leq \text{Boron} \leq 0.05\%$ $0\% \leq \text{Lead} \leq 0.2\%$ $0\% \leq \text{Tin} \leq 0.2\%$ $0\% \leq \text{Antimony} \leq 0.2\%$ the remainder composition being composed of iron and unavoidable impurities caused by processing, the microstructure of said steel sheet being made of ferrite and comprising in area fraction, 80% to 100% recrystallized microstructure, 0% to 20% non-recrystallized microstructure wherein the average grain size of recrystallized microstructure is from 20 microns to 110 microns and having a percentage of eddy current losses in total iron losses, measured at 1 T and 400 Hz according to IEC 60404-2 standards, less than 25% when calculated in accordance of Bertotti method and simultaneously having a magnetic polarization at 5000 A/m (J50) from 1.625 T to 1.690 T.

The present invention also provides a method of production of a non-oriented electrical steel sheet as described above comprising the following successive steps:

providing a steel composition as described above;

reheating said semi-finished product to a temperature from 1100° C. to 1250° C.;

rolling the said semi-finished product wherein the hot rolling finishing temperature shall be from 840° C. to 900° C. to obtain a hot rolled steel sheet.

cooling the hot rolled sheet immediately after the finishing of hot rolling then the hot rolled steel sheet is cooled from finishing of hot rolling to a coiling temperature range which is from 540° C. to 640° C. at a cooling rate of at least 10° C./s thereafter coiling the hot rolled steel sheet in the coiling temperature range from 540° C. to 640° C.

optionally performing scale removal process on said hot rolled steel sheet;

optionally hot band annealing is performed on hot rolled steel sheet from 650° C. to 1100° C. during 10 seconds to 96 hours;

optionally performing scale removal process on said hot rolled steel sheet;

cold rolling the said hot rolled steel sheet with a reduction rate from 50% to 95% to obtain a cold rolled steel sheet;

thereafter annealing the said cold rolled steel sheet wherein the heating for annealing starts from room temperature to an annealing temperature range Tsoak which is from 900° C. to 1000° C., with a heating rate HR1 of at least 1° C./s, then perform annealing at annealing temperature during 10 to 5000 seconds, then cooling the cold rolled steel sheet which starts from the annealing temperature to a temperature T1 from 300° C. to 20° C., with a cooling rate CR1 from 1° C./s to 150° C./s then cooling to room temperature to obtain a non-oriented electrical steel sheet.

Another object of the present invention is also to make available a method for the manufacturing of these sheets that is compatible with conventional industrial applications while being robust towards manufacturing parameters shifts.

DETAILED DESCRIPTION

The above object and other advantages of the present invention will become more apparent by describing in detail the preferred embodiment of the present invention.

The chemical composition of the non-oriented electrical steel comprises of the following elements in weight percent:

Carbon is present in the steel of the present invention from 0.0001% to 0.007%. Carbon is a precipitate forming element that is why detrimental for the magnetic properties of the present steel. Hence the presence of Carbon in the present steel is from 0.0001% to 0.007%. Since the Carbon promotes magnetic aging the preferred content of Carbon according to the present invention is from 0.002% to 0.007% and more preferably from 0.002% to 0.005%.

Manganese content of the steel of the present invention is from 0.15% to 0.25%. Manganese provides solid solution strengthening and reducing the iron loss by increasing specific resistance. When the addition of manganese amount is above 0.25%, the magnetic flux density may be considerably reduced, and recrystallization of the steel will be hindered during annealing. The preferred limit for the presence of Manganese is from 0.16% to 0.24% and more preferably 0.17% to 0.22%.

Silicon content of the steel of the present invention is from 2.9% to 3.4%. Silicon is an element that contributes to increasing the strength by solid solution strengthening and is a key element to reduce eddy current loss of iron loss by increasing specific resistance of steel. The mentioned effects requires a minimum Silicon content of at least 2.9%. However, when silicon content is in an amount exceeding 3.4% it causes rolling to be difficult and the magnetic induction of the steel will be significantly lowered. The preferred limit for the presence of Silicon is from 3% to 3.3% and more preferably from 3.1% to 3.3%.

The content of the Aluminum is from 0.8% to 1.1%. Aluminum increases the electrical resistivity of the material and can effectively reduce the iron loss of the steel. When the content of Aluminum is present more than 1.1%, the magnetic induction of the steel will be significantly reduced, and it is also detrimental to the rollability of cold rolling of the steel of the present invention. The preferred limit for the presence of Aluminium is from 0.85% and 1.1% and more preferably from 0.9% to 0.98%.

Sulfur is not an essential element but may be contained as an impurity in steel and from the point of view of the present invention the Sulfur content is preferably as low as possible but 0.006% or less from the viewpoint of manufacturing cost. Further if higher Sulfur is present in steel it combines to form Sulfides which are detrimental for the magnetic properties of the present invention.

The phosphorus constituent of the Steel of the present invention is from 0% to 0.15%, Phosphorus reduces the hot and cold ductility, particularly due to its tendency to segregate at the grain boundaries or co-segregate with Manganese. For these reasons, its content is limited to 0.15% and preferably lower than 0.09%.

Nitrogen is limited to 0.09% to minimize the precipitation of Aluminum nitrides during solidification which are detrimental for magnetic properties of the steel.

Titanium is an optional element and when added to the Steel of the present invention is from 0% to 0.1%. It forms Titanium-nitrides appearing during solidification of the cast product. The amount of Titanium is so limited to 0.1% to avoid the formation of Titanium-nitrides detrimental for magnetic properties of the steel of the present invention. In case the Titanium content below 0.001% does not impart any effect on the steel of the present invention.

Niobium is present in the Steel of the present invention from 0% to 0.1% and suitable for forming carbo-nitrides to increase strength of the Steel of the present invention by precipitation hardening. Niobium will also impact the size of microstructural components through its precipitation as carbo-nitrides. However, Niobium content above 0.1% is not economically interesting as a saturation effect.

Vanadium is present in the Steel of the present invention from 0% to 0.1% and is effective in enhancing the strength of steel by forming carbides or carbo-nitrides and the upper limit is 0.1% from an economic point of view.

Chromium is an optional element for the steel of the present invention is from 0% to 1%. Chromium provide strength to the steel by solid solution strengthening but when used above 1% impairs the magnetic properties of the steel. In a preferred embodiment, chromium content is at least 0.01%.

Molybdenum is an optional element that constitutes 0% to 0.5% of the Steel of the present invention. Mo has an effect of coarsening carbide and thus reducing the iron loss. When it exceeds 0.5%, the effect of improving the iron loss is saturated.

Tungsten is an optional element that constitutes 0% to 0.1% of the Steel of the present invention. Tungsten has an effect of coarsening carbide and reducing the iron loss, like Mo. However, when the addition amount is less than 0.001 mass %, the above effect cannot be obtained sufficiently, while when it exceeds 0.1 wt. %, the effect of improving the iron loss is saturated.

Cobalt is an optional element that constitutes 0% to 1% of the Steel of the present invention. Cobalt is an element increasing the magnetic moment of Fe alloy and has an effect of increasing a magnetic flux density and reducing the iron loss. However, when the addition amount is less than 0.01 wt. %, the above effects cannot be obtained sufficiently, while when it exceeds 1 wt. %, the raw material cost is largely increased.

Arsenic is an optional element that constitutes 0% to 0.05% of the Steel of the present invention. As is a grain boundary segregation element and has an effect of improving the texture and thus reducing the iron loss. The above effect is obtained by the addition of not less than 0.001 wt. %. However, As is an element causing grain boundary embrittlement, and this adverse effect becomes particularly remarkable when it is added by more than 0.05 wt. %. Therefore, As is preferable to be added within the range of 0.001 to 0.05 wt. %

Nickel may be added as an optional element in an amount of 0% to 1% to increase the strength of the steel present invention and to improve its strength and elongation. However, when its content is above 1%, Nickel causes ductility deterioration. In a preferred embodiment, nickel content remains below 0.04%.

Copper may be added as an optional element in an amount of 0% to 1% to increase the strength and elongation of the of Steel of the present invention. However, when its content is above 1%, it can degrade the surface aspects. In a preferred embodiment, copper content is at least 0.01%.

Boron is an optional element for the steel of the present invention and may be present from 0% to 0.05%. Boron forms boro-nitrides and impart additional strength to steel of the present invention when added in an amount of at least 0.0001%.

Calcium may be present in the steel of the present invention optionally and may be from 0.001% to 0.01%. Calcium contributes towards the refining of the Steel by binding the detrimental Sulfur content in globular form thereby retarding the harmful effect of Sulfur.

Other elements such as Sn, Pb or Sb can be added individually or in combination in the following proportions: Sn≤0.2%, Pb≤0.2% and Sb≤0.2%. Up to the maximum content levels indicated, these elements make it possible to refine the grain during solidification. In a preferred embodiment, Sn content is below 0.04%.

The remainder of the composition of the steel consists of iron and inevitable impurities resulting from processing.

$$3.85\% \leq Si+Al+Mn \leq 5.5\%$$

The non-oriented electrical steel sheet according to the invention mandatorily contains Silicon, Manganese and Aluminum such that the total content is from 3.85% to 5.5 wt. %. When the total content of Si, Mn and Al is less than 3.85%, it is not possible to achieve the mechanical properties with the magnetic properties. However, when the total content of Si, Mn and Al exceeds 5.5%, steel is hardened and the rolling becomes difficult. The preferred limit for the presence of Si, Mn and Al is from 3.9% to 5.2% and more preferably from 4% to 5%.

The microstructure of the non-oriented electrical steel will now be described in detail, all percentages being in area fraction.

The microstructure is made of ferrite. The steel of the present invention has a recrystallized microstructural region from 80% to 100% in area fraction with grains having an average grain size from 20 microns to 110 microns. The recrystallized structure with a high degree of recrystallization is due to the homogenous Silicon enrichment which improves magnetic properties of the steel of the present invention. A controlled grain size ensures the mechanical properties in both transverse and rolling direction. The preferred degree of recrystallization is from 90% to 100%. The preferred an average grain size for the present invention is from 20 microns to 100 microns and more preferably from 20 microns to 90 microns.

The steel of the present invention may have a non-recrystallized microstructural region from 0% to 20% in area fraction and the preferred degree of non-recrystallization is from 0% to 10% and more preferably from 0% to 5%.

In addition to the above-mentioned microstructure, the microstructure of the non-oriented electrical steel is free from microstructural components such as martensite, bainite, pearlite and cementite.

The steel according to the invention can be manufactured by any suitable methods. It is however preferable to use the method according to the invention that will be detailed, as a non-limitative example.

Such preferred method consists in providing a semi-finished casting of steel with a chemical composition of the steel according to the invention. The casting can be done either into ingots or continuously in form of thin slabs or thin strips, i.e. with a thickness ranging from approximately 240 mm or less for any form of casting.

For example, the cast in form of a slab is casted with the chemical composition according to the invention and then it is reheated, the Slab Reheating Temperature lying from 1080° C. to 1180° C. until the temperature is homogeneous through the whole slab. Below 1100° C., rolling becomes difficult and forces on the mill will be too high. Above 1180° C., high silicon grades become very soft and might show some sagging and thus become difficult to handle. The preferred slab reheating temperature is from 1090° C. to 1170° C. and more preferably from 1100° C. to 1160° C.

Subjecting the reheated slab to hot rolling wherein the hot rolling finishing temperature plays a role on the final hot rolled microstructure and takes place from 840° C. to 900° C. When the Finishing Rolling Temperature is below 840° C., recrystallization is limited and the microstructure is highly deformed. Above 900° C. would mean more impurities in solid solution and possible consequent precipitation and deterioration of magnetic properties as well. The preferred hot rolling finishing temperature is from 850° C. to 890° C. and more preferably 850° C. to 880° C.

The hot rolled steel sheet obtained in this manner is then cooled immediately at a cooling rate of at least 10° C./s to the Coiling Temperature of the hot rolled steel sheet which also plays a role on the hot rolled steel sheet; it takes place from 540° C. to 640° C. Coiling at temperatures below 540° C. will not have the proper distribution and size of the precipitates for the steel of the present invention. Above 640° C., a thick oxide layer would appear, and it will cause difficulties for subsequent processing steps such as cold rolling and/or pickling. Preferably, the cooling rate will be less than or equal to 200° C./s and more preferably the cooling rate is from 12° C./s to 75° C./s. The preferred Coiling Temperature is from 540° C. to 590° C.

The coiled hot rolled steel sheet is then cooled down to room temperature before subjecting it to optional hot band annealing.

The hot rolled steel sheet may be subjected to an optional scale removal step to remove the scale formed during the hot rolling before optional hot band annealing. The hot rolled sheet then be subjected to an optional hot band annealing such hot band annealing is performed at temperatures from 900° C. to 1000° C., preferably for at least 10 seconds and not more than 96 hours, the temperature preferably remaining from 910° C. to 990° C. and more preferably from 940° C. to 980° C. Thereafter, an optional scale removal step of this hot rolled steel sheet may be performed through, for example, pickling of such sheet. The preferred time for hot band annealing is from 10 seconds to 500 seconds and more preferably from 20 seconds to 120 seconds.

Thus, the hot rolled steel sheet obtained may optionally have thickness from 0.8 mm to 3.5 mm and preferably from 0.9 mm to 3 mm and more preferably 1 mm to 2.8 mm.

This hot rolled steel sheet is then subjected to cold rolling to obtain a cold rolled steel sheet with a thickness reduction from 50 to 95%. Preferably, the thickness reduction from 60% to 95% and more preferably from 75% to 95%.

Thereafter the cold rolled steel sheet is being heat treated which will impart the steel of the present invention with requisite mechanical properties and microstructure.

The cold rolled steel sheet is then heated wherein the heating starts from room temperature, the cold rolled steel sheet being heated, at a heating rate HR1 of at least 1° C./s, to an annealing temperature Tsoak which is from 890° C. to 960° C. In a preferred embodiment, the heating rate HR1 for heating is at least 2° C./s and more preferably at least 5° C./s. The preferred Tsoak Temperature is from 890° C. to 950° C.

The cold rolled steel sheet is held at Tsoak during 10 seconds to 5000 seconds to ensure a recrystallization from 80% to 100%.

The cold rolled steel sheet is then cooled wherein cooling starts from Tsoak, the cold rolled steel sheet being cooled down, at a cooling rate CR1 from 1° C./s to 150° C./s, to a temperature T1 which is in a range from 20° C. to 300° C. In a preferred embodiment, the cooling rate CR1 is from 3° C./s to 120° C./s. The preferred T1 temperature is from 20° C. to 200° C.

The cold rolled steel sheet thus obtained must have a thickness from 0.15 mm to 0.22 mm and more preferably from 0.16 mm to 0.21 mm and even more preferably from 0.18 mm to and 0.21 mm.

Then, the cold rolled steel sheet is cooled down to room temperature to obtain a non-oriented electrical steel sheet.

The non-oriented electrical steel sheet of the present invention may optionally be coated with insulation, organic coating or inorganic coating or combination of to improve isolation.

EXAMPLES

The following tests, examples, figurative exemplification and tables which are presented herein are non-restricting in nature and must be considered for purposes of illustration only and will display the advantageous features of the present invention.

Steel sheets made of steels with different compositions are gathered in Table 1, where the steel sheets are produced according to process parameters as stipulated in Table 2, respectively. Thereafter, table 3 gathers the result of evaluations of obtained properties.

All steels of Table 1 had a nitrogen content below 0.09%.

Table 2 gathers the hot rolling and annealing process parameters implemented on cold rolled steel sheets to impart the steels of table 1 with requisite mechanical and magnetic properties to become a non-oriented electrical steel. All the Inventive steels that is from I1 to I4 are cooled after hot rolling at cooling rate of 15° C./s. Further for the inventive examples the heating rate HR1 to the annealing soaking temperature is 5° C./s. The T1 temperature for all the inventive examples is 25° C. while the cooling rate CR1 is at 5° C./s.

All steels produced according to table 2 parameters showed a microstructure with more than 95% of recrystallization and with a grain size from 20 to 110 μm.

TABLE 1

| Steel | C | Mn | S | Al | P | S | Cr | Cu |
|-------|------|------|------|------|------|------|------|------|
| I1 | 0.0048 | 0.217 | 3.26 | 0.93 | 0.0117 | 0.0013 | 0.0283 | 0.020 |
| I2 | 0.0048 | 0.217 | 3.27 | 0.94 | 0.0117 | 0.0013 | 0.0283 | 0.020 |
| I3 | 0.0039 | 0.213 | 3.28 | 0.93 | 0.0121 | 0.0013 | 0.0267 | 0.016 |
| I4 | 0.0029 | 0.175 | 3.15 | 0.90 | 0.0130 | 0.0013 | 0.0267 | 0.021 |

TABLE 2

| Trials | Reheating (° C.) | FRT (° C.) | Coiling (° C.) | HBA (° C.) | HBA time(s) | Reduction (%) | Tsoak (° C.) | Annealing time(s) | Cold rolled thickness(mm) |
|---|---|---|---|---|---|---|---|---|---|
| I1 | 1128 | 856 | 555 | 955 | 25 | 88 | 945 | 40 | 0.191 |
| I2 | 1128 | 856 | 555 | 955 | 25 | 87 | 940 | 32 | 0.203 |
| I3 | 1154 | 867 | 554 | 950 | 25 | 90 | 935 | 40 | 0.194 |
| I4 | 1132 | 860 | 548 | 970 | 25 | 90 | 905 | 20 | 0.199 |

Table 3

The results of the various mechanical tests conducted in accordance with the standards are gathered. The ultimate tensile strength, total elongation and yield strength are measured in accordance with NF EN ISO 6892-1 standards and the J50 magnetic properties and the total iron losses at 1 T and 400 Hz were measured in accordance with IEC 60404-2 standards. The Eddy current losses are calculated in accordance with the Bertotti Method published in the paper entitled as "General Properties of Power Losses in Soft Ferromagnetic Materials" by Giorgio Berttoti published in IEEE TRANSACTIONS ON MAGNETICS, Vol. 24, No. 1 of January 1988. The Equation 2 identifies classical losses which is designated by ($P^{class}$) which for the purpose of this invention is referred to as Eddy current losses.

The average grain size of the recrystallized microstructure is measured in accordance with ASTM E112 96 (02) standards with linear intercept method.

| Trials | Yield Strength (MPa) RD | Yield Strength (MPa) TD | Tensile Strength (MPa) RD | Tensile Strength (MPa) TD | Total Elongation (%) RD | Total Elongation (%) TD | J50 (T) | P1T/400 Hz (W/kg) | % of Eddy current losses |
|---|---|---|---|---|---|---|---|---|---|
| I1 | 447 | 470 | 565 | 595 | 18.2 | 16.6 | 1.633 | 11.72 | 18.0 |
| I2 | 475 | 478 | 601 | 605 | 18.3 | 21.7 | 1.630 | 11.92 | 19.9 |
| I3 | 453 | 470 | 583 | 601 | 21.5 | 18.6 | 1.679 | 11.67 | 18.5 |
| I4 | 440 | 448 | 566 | 575 | 22.2 | 21.1 | 1.638 | 11.69 | 20.1 |

What is claimed is:

1. A non-oriented electrical steel sheet having a composition comprising of the following elements, expressed in percentage by weight:

$0.0001\% \leq$ carbon $\leq 0.007\%$ $0.15\% \leq$ manganese $\leq 0.25$ $3.1\% \leq$ silicon $\leq 3.3\%$ $0.8\% \leq$ aluminum $\leq 1.1\%$ phosphorus $\leq 0.15\%$ sulfur $\leq 0.006\%$ nitrogen $\leq 0.09\%$ with $3.85\% \leq$ Si + Al + Mn $\leq 5.5\%$ and optionally or or more of the following elements:

$0\% \leq$ niobium $\leq 0.1\%$ $0\% \leq$ titanium $\leq 0.1\%$ $0\% \leq$ vanadium $\leq 0.1\%$ $0\% \leq$ chromium $\leq 1\%$ $0\% \leq$ molybdenum $\leq 0.5\%$ $0\% \leq$ tungsten $\leq 0.0\%$ $0\% \leq$ cobalt $\leq 1\%$ $0\% \leq$ arsenic $\leq 0.05\%$ $0.001\% \leq$ calcium $\leq 0.01\%$ $0\% \leq$ copper $\leq 1\%$ $0\% \leq$ nickel $\leq 1\%$ $0\% \leq$ boron $\leq 0.05\%$ $0\% \leq$ lead $\leq 0.2\%$ $0\% \leq$ tin $\leq 0.2\%$ $0\% \leq$ antimony $\leq 0.2\%$ a remainder of the composition being composed of iron and unavoidable impurities caused by processing,
a microstructure of the steel sheet being made of ferrite and comprising in area fraction, 80% to 100% recrystallized microstructure, 0% to 20% non-recrystallized microstructure wherein an average grain size of recrystallized microstructure is from 20 microns to 110 microns and having a percentage of eddy current losses in total iron losses, measured at 1T and 400 Hz according to IEC 60404-2 standards, less than 25% when calculated in accordance of Bertotti method and simultaneously having a magnetic polarization at 5000A/m (J50) from 1.625T to 1.690T.

2. The non-oriented electrical steel sheet as recited in claim 1. wherein the composition includes 0.002% to 0.007% of carbon.

3. The non-oriented electrical steel sheet as recited in claim 1, wherein the composition includes 0.85% to 1.1% of aluminum.

4. The non-oriented electrical steel sheet as recited in claim 1. wherein the composition includes 0.16% to 0.24% of manganese.

5. The non-oriented electrical steel sheet as recited in claim 1, wherein the amount of non-recrystallized microstructure is from 0% to 10%.

6. The non-oriented electrical steel sheet as recited in claim 1. wherein the amount of recrystallized microstructure is from 90% to 100%.

7. The non-oriented electrical steel sheet as recited in claim 1, wherein the steel sheet has an ultimate tensile strength of at least 540 MPa in both a transversal direction as well as a rolling direction.

8. The non-oriented electrical steel sheet as recited in claim 1, wherein the steel sheet has a yield strength from 430 MPa or more in both a transversal direction as well as a rolling direction.

9. The non-oriented electrical steel sheet as recited in claim 1, wherein the steel sheet has a total elongation of at least 14% in both transversal direction as well as a rolling direction.

10. A method of production of a non-oriented electrical steel sheet as recited in claim 1, comprising the following successive steps:
    providing a semi-finished product having the composition;
    reheating the semi-finished product to a temperature from 1100° C. to 1250° C.;
    rolling the semi-finished product wherein the hot rolling finishing temperature is from 840° C. to 900° C. to obtain a hot rolled steel sheet;
    cooling the hot rolled sheet immediately after the finishing of hot rolling;
    then cooling the hot rolled steel sheet from the finishing of hot rolling to a coiling temperature range which is from 540° C. to 640° C. at a cooling rate of at least 10° C./s;
    thereafter coiling the hot rolled steel sheet in the coiling temperature range from 540° C. to 640° C.;
    optionally performing scale removal process on the hot rolled steel sheet;
    optionally hot band annealing is performed on the hot rolled steel sheet from 650° C. to 1100° C. for 10 seconds to 96 hours;
    optionally performing scale removal process on the hot rolled steel sheet;
    cold rolling the hot rolled steel sheet with a reduction rate from 50% to 95% to obtain a cold rolled steel sheet;
    thereafter annealing the cold rolled steel sheet wherein the heating for annealing starts from room temperature to an annealing temperature range Tsoak which is from 900° C. to 1000° C., with a heating rate HR1 of at least 1° C./s;
    then perform annealing at annealing temperature for 10 to 5000 seconds;
    then cooling the cold rolled steel sheet starting from the annealing temperature to a temperature T1 from 300° C. to 20° C., with a cooling rate CR1 from 1° C./s to 150° C./s; and
    then cooling to room temperature to obtain a non-oriented electrical steel sheet.

11. The method as recited in claim 10, wherein the Tsoak temperature for annealing is from 900° C. to 980° C.

12. The method as recited in claim 10, wherein temperature T1 is from 200° C. to 20° C.

13. The method as recited in claim 10, wherein the cooling rate CR1 is from 3° C./s to 120° C./s.

* * * * *